(12) United States Patent
McFarlane et al.

(10) Patent No.: US 10,208,706 B2
(45) Date of Patent: Feb. 19, 2019

(54) MACHINERY CASING PORTION

(71) Applicant: Ford Global Technologies, LLC, Dearborn, MI (US)

(72) Inventors: Andrew John McFarlane, Rayleigh (GB); Tsunou Chang, Billericay (GB); Kevin Murphy, Brentwood (GB); Dave Harknett, Rochford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 237 days.

(21) Appl. No.: 15/256,338

(22) Filed: Sep. 2, 2016

(65) Prior Publication Data
US 2017/0089294 A1 Mar. 30, 2017

(30) Foreign Application Priority Data

Sep. 24, 2015 (GB) .................................. 1516939.4

(51) Int. Cl.
| | | |
|---|---|---|
| *F02F 1/42* | (2006.01) | |
| *F02F 11/00* | (2006.01) | |
| *F02F 1/24* | (2006.01) | |
| *F02F 7/00* | (2006.01) | |
| *F16J 15/06* | (2006.01) | |
| *F16J 15/14* | (2006.01) | |

(52) U.S. Cl.
CPC .............. *F02F 11/002* (2013.01); *F02F 1/24* (2013.01); *F02F 7/0021* (2013.01); *F16J 15/062* (2013.01); *F16J 15/14* (2013.01); *F02F 2200/00* (2013.01)

(58) Field of Classification Search
CPC .......... F02F 11/002; F02F 1/24; F02F 7/0021; F02F 2200/00; F02F 7/0024; F02F 7/0026; F16J 15/14; F16J 15/062; F16J 15/02

USPC ........................................................ 277/591
See application file for complete search history.

(56) References Cited

U.S. PATENT DOCUMENTS

| | | | | |
|---|---|---|---|---|
| 7,753,379 B2* | 7/2010 | Galpin | ................... | F16J 15/062 |
| | | | | 277/598 |
| 7,845,331 B2* | 12/2010 | Alamond | ................ | F02B 63/02 |
| | | | | 123/195 R |
| 2008/0246236 A1 | 10/2008 | Lombano et al. | | |
| 2011/0259294 A1* | 10/2011 | Herzer | ..................... | F01M 1/02 |
| | | | | 123/196 A |

FOREIGN PATENT DOCUMENTS

JP H109052 A 1/1998

OTHER PUBLICATIONS

Examination Report of Great Britain Patent Application No. 1516939. 4, dated Mar. 30, 2016, 7 pages, United Kingdom Intellectual Property Office.

* cited by examiner

*Primary Examiner* — Hung Q Nguyen
(74) *Attorney, Agent, or Firm* — Julia Voutyras; McCoy Russell LLP

(57) ABSTRACT

A machinery casing portion for an engine, the machinery casing portion having a first sealing face configured to engage a second sealing face of a second machinery casing portion so as to form a sealed joint therebetween in an assembled configuration, the machinery casing portion comprising: a recess configured to receive a sealant, the recess being provided adjacent to the first sealing face; and at least one opening configured to receive a fastener, wherein the opening at least partially extends into a wall of the recess.

20 Claims, 3 Drawing Sheets

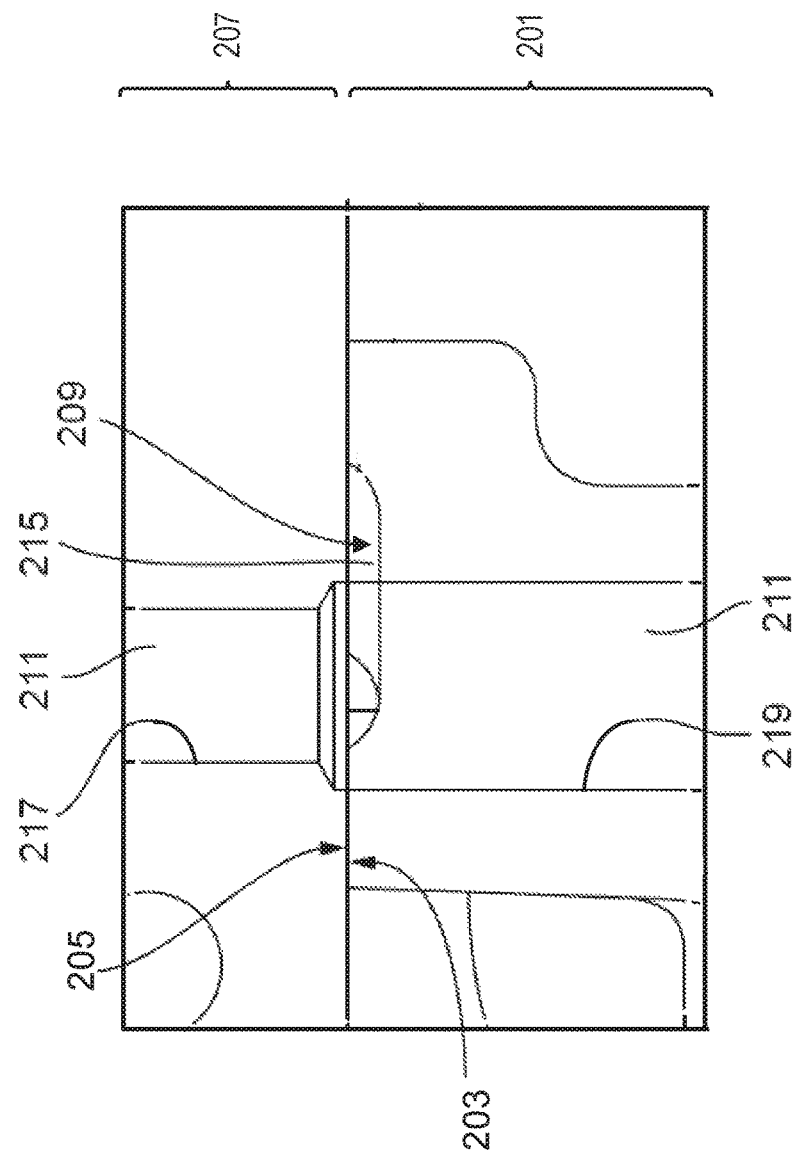

MACHINERY CASING PORTION

CROSS-REFERENCE TO RELATED APPLICATIONS

This application claims priority to Great Britain Patent Application No. 1516939.4, filed Sep. 24, 2015, the entire contents of which are hereby incorporated by reference for all purposes.

FIELD

This disclosure relates to a casing portion for a machine, and in particular, but not exclusively, relates to a casing portion having a first sealing face configured to form a sealed joint between the casing portion and another casing portion.

BACKGROUND/SUMMARY

It is common for an automotive manufacturer to design a component so that it can be used across a range of vehicle platforms. One of the challenges that the automotive manufacturer faces is how to package an engine in an engine bay of a number of different vehicles. For example, it may be particularly difficult to package a larger engine in the engine bay of a smaller vehicle. It is desirable, therefore, to reduce the packaging requirements of the engine so that it can be installed in a wider range of vehicle platforms.

One way of reducing the packaging requirements of the engine is to reduce the overall size of an engine casing. This is particularly difficult as the size of the engine casing is defined by the configuration of the engine components. Further, the engine casing is a structural component that is assembled from a number of different casing components, including a crankcase, a cylinder block and a cylinder head. In order to provide the necessary structural requirements, the casing components are sized accordingly and assembled using fasteners that clamp the casing components together, providing the required casing rigidity.

A further requirement of the engine casing is to seal engine fluids within the engine. As such, the joints between various components of the engine casing are designed to prevent fluids leaking out of the engine. It is difficult to reduce the packaging requirements of the engine casing while maintaining the structural and sealing requirements of the joints between engine casing components.

According to an aspect of the present disclosure, a casing portion is provided, for example a casing portion of a machine such as an engine or a gearbox. The casing portion may be a crankshaft casing, a cylinder block casing, a cylinder head casing or other portion of an engine casing. The casing portion has a first sealing face configured to engage a second sealing face of another casing portion so as to form a sealed joint therebetween in an assembled configuration. The casing portion comprises a recess configured to receive a sealant, for example a sealant retention channel. The recess is provided adjacent to, e.g. adjoining or next to, the first sealing face of the casing portion. For example, the recess may be a pocket or channel that is provided in a portion of the first sealing face. The casing portion comprises at least one opening configured to receive a fastener configured to clamp the casing portion to one or more other casing portions. The opening at least partially extends into a wall of the recess. The opening may extend into the first sealing face. At least a portion of an edge of the opening may be recessed from the first sealing face.

The casing portion may be configured to house one or more engine components. The casing portion may be configured to seal a fluid within the engine casing. The casing portion may be one of: a cylinder block of an engine, a crankcase of an engine, a cylinder head of an engine and a sump casing of an engine.

The recess may be a sealant recess extending along the first sealing face. The recess may be offset from a peripheral edge of the first sealing face. The recess may extend at least partially across at least one of the openings in the first sealing face.

The recess may be configured to divide the first sealing face into a plurality of sealing face portions. For example, the recess may divide the first sealing face into one or more peripheral portions and one or more inner portions. The recess may be configured to form the sealant retention channel between the inner portion and the peripheral portion. The profile of the sealant retention channel may be symmetrical about a centerline of the sealant retention channel between the inner portion and the peripheral portion. For example, the cross-sectional profile of the sealant retention channel may be such that the sealant retention channel may be machined into the first sealing face using a single machining tool and/or in a single machining operation.

The peripheral portion may extend at least partially around the periphery of the first sealing face. The peripheral portion and/or the inner portion may extend at least partially around the inner edge of the first sealing face. The peripheral portion and/or the inner portion may be adjacent to at least one of the openings. The peripheral portion and/or the inner portion may adjoin an edge of the opening. The peripheral portion and/or the inner portion may be offset from an edge of the opening.

The recess may fluidically connect the opening to an inner face of the casing portion. For example, the recess may permit a fluid contained within the casing portion to flow between the opening and the inside of the casing portion such that the fastener is exposed to the fluid contained within the casing portion.

The opening may extend into at least one of the first sealing face, the recess and the inner portion. The recess may extend along the first sealing face, for example in a direction that is perpendicular to the longitudinal axis of the opening. The recess may extend at least partially across the opening.

The inner portion may extend partially around the periphery of the opening. For example, the peripheral portion and/or the inner portion may be configured to surround only a portion of the perimeter of the opening. The peripheral portion and/or the inner portion may be configured to bear against a load applied by the fastener. For example, the peripheral portion may be a peripheral bearing portion, and the inner portion may be an inner bearing portion. The peripheral bearing portion and/or the inner bearing portion may each comprise a surface configured to resist a proportion of a clamp load applied by the fastener. The surface area of the peripheral bearing portion and/or the inner bearing portion may be configured to provide the required bearing area for a clamp load applied by the fasteners. For example, the surface area of the peripheral bearing portion and/or the inner bearing portion may be determined according to a maximum allowable bearing stress. The surface area of the peripheral bearing portion and/or the inner bearing portion may be selected according to the minimum surface area that provides support for the clamp load applied by one or more of the fasteners.

The casing portion may be cast from a metallic material. The recess may be manufactured as an as-cast feature. In the context of the present disclosure, the term "as-cast feature" is defined as a feature of the casing portion that has not received finishing, for example beyond gate removal, and/or treatment of any kind, such as heat treatment or surface treatment after casting. In this manner, an as-cast feature is a feature that has not been subject to any further machining and/or treatment processes after the manufacture of the feature using a casting process, i.e. that feature is functional in its as-cast state. The benefit of an as-cast feature is that the manufacturing costs of the casing portion can be reduced by minimizing the number of manufacturing processes that are performed on the casing portion.

The casing portion may be molded from a polymeric material. The recess may be manufactured as an as-molded feature. In the context of the present disclosure, the term "as-molded feature" is defined as a feature of the casing portion that has not received finishing, for example beyond gate removal, and/or treatment of any kind, such as heat treatment or surface treatment after molding. In this manner, an as-molded feature is a feature that has not been subject to any further machining and/or treatment processes after the manufacture of the feature using a molding process, i.e. that feature is functional in its as-molded state. The benefit of an as-molded feature is that the manufacturing costs of the casing portion can be reduced by minimizing the number of manufacturing processes that are performed on the casing portion.

There is provided an engine and/or a vehicle comprising one or more of the above described casing portions.

According to another aspect of the present disclosure there is provided a method of manufacturing a casing portion for an engine. The casing portion has a first sealing face configured to engage a second sealing face of another casing portion so as to form a sealed joint therebetween in an assembled configuration. The method comprising providing a recess in the first sealing face. The recess is configured to receive a sealant. The method comprises providing at least one opening configured to receive a fastener. The opening at least partially extends into a surface of the recess.

To avoid unnecessary duplication of effort and repetition of text in the specification, certain features are described in relation to only one or several aspects or arrangements of the disclosed subject matter. However, it is to be understood that, where it is technically possible, features described in relation to any aspect or arrangement of the disclosure may also be used with any other aspect or arrangement of the disclosure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 shows a partial cross section through the casing portion shown in FIG. 2 when assembled with another casing portion.

DETAILED DESCRIPTION

Figure 1:
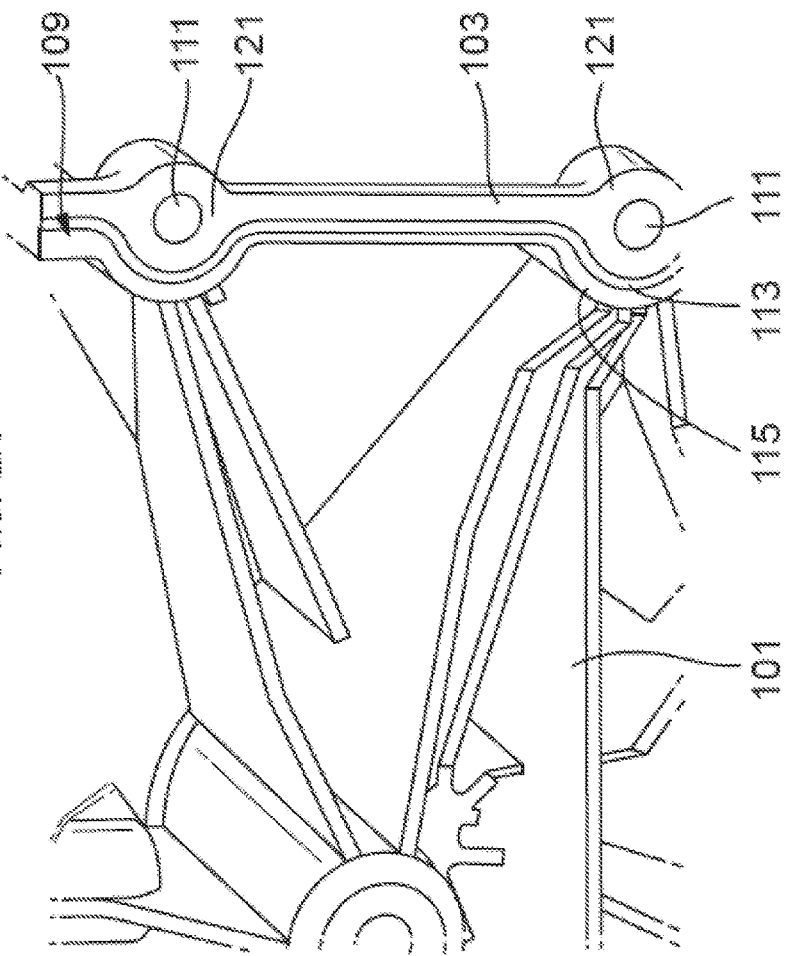
FIG. 1 shows a partial perspective view of a casing portion for an engine according to the prior art.

FIG. 1 shows a conventional casing portion 101 for an engine, such as an engine cover configured to attach to and seal against another casing portion of the engine. The casing portion 101 has a first sealing face 103 configured to engage a second sealing face of the other casing portion so as to form a sealed joint therebetween in an assembled configuration. In the arrangement shown in FIG. 1, the first sealing face 103 comprises a planar surface that extends around the periphery of the casing portion 101.

The casing portion 101 comprises a recess 109, for example a channel, configured to retain a sealant. It is common for an automotive manufacturer to use a room-temperature vulcanizing (RTV) sealant to help seal a joint between the casing portions. However, the recess 109 may be configured to receive any appropriate type of sealant. The recess 109 is offset from a peripheral edge of the casing portion 101 and extends around the inner edge of the sealing face 103. During assembly of the casing portion 101, a bead of sealant (not shown) is applied along the length of the recess 109 such that the height of the sealant bead is greater than the depth of the recess 109. When the casing portion 101 is brought together with another casing portion, the sealant bead is squeezed such that it spreads out in the recess 109 to help seal the joint between the first sealing face 103 and second sealing face. To help squeeze the sealant into the joint between the casing portions, the recess 109 has a sloping surface 113, for example a chamfer, that provides a transition between a bottom surface 115 of the recess 109 and the first sealing face 103. In order to ensure that the sealant spreads out in the required manner, the dimensions of the sealant channel are carefully chosen such that a reliable seal is formed when the sealant is pressed towards the abutment between the first sealing face 103 and a sealing face of another casing portion.

After the casing portions have been brought into engagement, they are clamped together using one or more fasteners (not shown). The casing portions each comprise one or more openings 111 configured to receive a fastener. In order to support the required clamp loads, each of the openings 111 has a bearing area 121 that surrounds the opening 111 and is configured to support the clamp load of the fasteners.

One of the difficulties in designing the casing portion 101 is packaging the recess 109, the opening 111 and the bearing area 121 in the first sealing face 103. In many cases, it is desirable to minimise the internal dimensions of the casing portion 101 to help reduce the overall dimensions of the engine casing. However, it is difficult to reduce the size, for example the thickness of the casing portion 101, whilst maintaining the requirements of sealing the joint between the casing portions and providing enough material, i.e. the bearing area 121, around the openings 111 to support the clamp loads required to hold the engine casing together. In particular, it is difficult to reduce the thickness of the casing portion 101 in areas where the recess 109 extends around the opening 111.

A further restriction on the design of the casing portion 101 is the cost of manufacture. For this reason, it is desirable to manufacture the recess 109 using a casting process, as opposed to a machining process, so that the recess 109 may be created as the casing portion 101 is cast. However, one of the problems associated with the casting process is the wear rate of the die-casting tooling. For example, as the tooling wears out, the size of the recess 109 in a first casing portion, which is produced at the start of the production run, may be larger than the size of the recess 109 in another casing portion 101 that is produced at the end of the production run. As a result, the size of the tooling must be set such that the size of the recess 109 produced at the end of the production run is within manufacturing tolerances and is still able to effect a reliable seal. In other words, the overall size of the casing portion 101 is increased to account for the wear rate of the tooling.

The present discloser provides a solution for how to maintain the manufacturing feasibility of an as-cast sealing feature while reducing the thickness of a casing portion for an engine.

Figure 2:
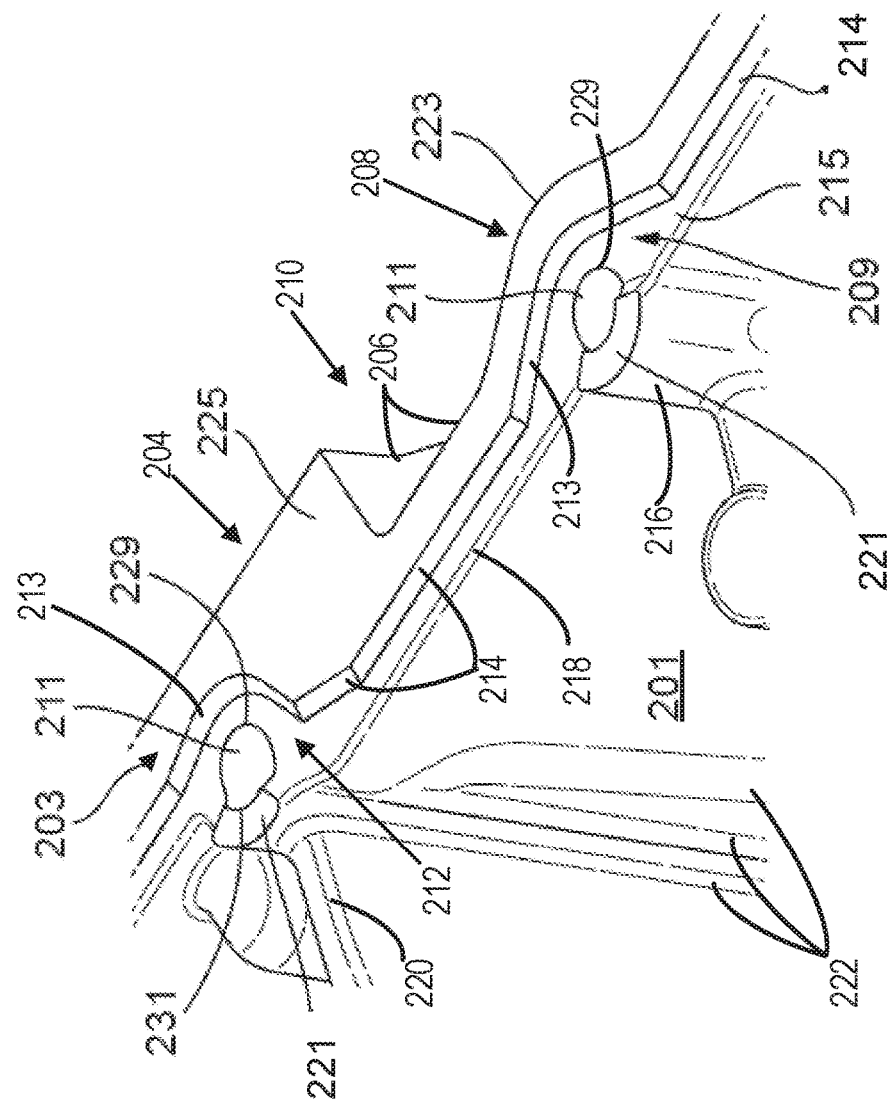
FIG. 2 shows a partial perspective view of a casing portion for an engine according to the present disclosure.

FIGS. 2-3 show a casing portion 201 according to the present disclosure. In the arrangement shown in the FIGS. 2-3, the casing portion 201 is a ladder frame casing of an engine. In other examples, the casing portion 201 may be an oil sump casing, a crankshaft casing, a cylinder block, a cylinder head, or any other appropriate portion of an engine casing. It is understood that while the description below describes the present disclosure by way of reference to an engine casing, the present disclosure may apply to any other type of casing that requires a sealed joint, for example a gearbox casing.

The casing portion 201 has a first sealing face 203 configured to engage a second sealing face 205 of another casing portion 207, such as a cylinder block, so as to form a sealed joint therebetween in an assembled configuration. In the arrangement shown in FIGS. 2-3, the first sealing face 203, second sealing face 205, each sealing face comprises a planar surface that extends around the periphery of the respective casing portions 201 and 207. However, the first and second sealing faces may be provided on any appropriate portion of the casing portions 201, 207 and may be of any appropriate form such that they can be brought into engagement to form a joint in the casing.

The casing portion 201 has an external planar surface 204 which merges with a curved external surface 208 to form a corner joint 210 with planar surfaces 206. For example, the external planar surfaces of the casing portion may comprise an outer surface of the engine ladder frame or engine cylinder block. In one example, the external planar surfaces of the casing portion may comprise a high strength material with adequate wear resistance, corrosion resistance and ability to withstand vibrations. As an example, the casing portion may comprise high strength materials such as a polymeric material, cast iron and aluminium.

The casing portion 201 comprises a recess 209 and 212, for example a sealant retention channel configured to retain a sealant in a similar manner to the recess 109 shown in FIG. 1. For example, the recess 209 and 212 have curved surfaces 213 which transition into sloping surfaces 214. The curve surfaces 213 and sloping surfaces 214 provide a transition between a bottom surface 215 of the recess 209 and 212, and the first sealing face 203. In order to ensure that the sealant spreads out in the required manner, the dimensions of the recess 209 and 212 are carefully chosen such that a reliable seal is formed when the sealant is pressed towards the abutment between the first and second sealing faces.

After the casing portions 201 and 207 have been brought into engagement, the casing portions are clamped together using one or more fasteners (not shown). The casing portions 201 and 207, each casing portion comprises one or more openings 211 configured to receive a fastener. The openings 211 are formed within an annular vertical pipe 216 mounted inside an interior region of the casing portion. For example, the casing portion 207 may have a threaded hole 217 formed in a first annular pipe to receive a stud/bolt. Similarly, the casing portion 201 may have a clearance hole 219 formed in a second annular pipe to receive the stud/bolt. In order to support the required clamp loads, each of the openings 211 has an external bearing area 221 surrounding the opening 211, at a top portion of the annular pipe. The bearing area provides a means to support clamp loads of the fasteners.

A pipe network, comprising a horizontal pipe 218, lateral pipe 220 and vertical pipes 222, is mounted in the interior region of the casing portion 201. For example, the horizontal, lateral and vertical pipes may be used to deliver fuel or sealant fluid to different components of the engine. In one example, the pipes inside the casing portion 201 may comprise materials such as stainless steel and aluminium. In another example, the pipes mounted in the interior region of the casing portion 201 may be designed to withstand corrosion, wear and high temperatures.

In contrast to the conventional casing portion 101 of FIG. 1, the casing portion 201 is configured such that the recess 209 and 212 extends in between a peripheral edge 223 of the casing portion 201 and at least one of the openings 211. In this manner, at least a portion of the opening 211 extends into a surface of the recess 209 and 212. As a result, at least a portion 229 of an edge of the opening is recessed from the first sealing face 203. In FIGS. 2-3, the opening 211 extends into the bottom surface 215 of the recess 209. However, the opening 211 may extend into one or more other surfaces of the recess 209, such as the curved surface 213 and sloping surface 214, in addition to or instead of the bottom surface 215.

In the arrangement shown in FIGS. 2-3, the recess 209 divides the first sealing face 203 into a plurality of portions. For example, the first sealing face 203 is divided into a peripheral portion 225 that extends around the periphery of the first sealing face 203 and at least one inner portion defined by the bearing area 221 on the top surface of the annular pipe 216. For example, each of the inner portions on the annular pipe are provided adjacent to the bearing area 221 around the fastener to support the clamp load, in an assembled configuration.

The inner portion on the annular pipe may directly adjoin a portion 231 of an edge of the opening 211, as shown in the arrangement of FIGS. 2-3. However, the inner portion on the annular pipe may be offset from an edge of the opening 211, for example where the opening 211 comprises a lead-in or where it has been countersunk. In such a scenario, the entirety of the edge of the opening 211 may be disposed within the recess 209.

In the arrangement of FIG. 1, the bearing area 121 extends completely around the opening 111. In order to reduce the package size of the casing portion 201, the present disclosure provides a reduced bearing area 221 that extends partially around the opening 211. The surface area of the inner portion on the annular pipe may be configured to provide the required bearing area 221 to support the clamp load applied by the fasteners. For example, in order to reduce the thickness of the casing portion 201, the surface area of the inner portion on the annular pipe may be configured to provide the minimum required bearing area 221. In this manner, the thickness of the casing portion 201 may be reduced by the maximum possible amount by overlapping the opening 211 into the recess 209 and the first sealing face 203.

In one example, a machinery casing portion having a first sealing face configured to engage a second sealing face of a second machinery casing portion so as to form a sealed joint therebetween in an assembled configuration, the machinery casing portion comprises: a recess configured to receive a sealant, the recess being provided adjacent to the first sealing face; and at least one opening configured to receive a fastener, wherein the opening at least partially extends into a wall of the recess. In the preceding example additionally or optionally, the recess divides the first sealing face into a peripheral bearing portion extending around a periphery of the first sealing face and at least one inner bearing portion, each inner bearing portion being adjacent to at least one of the openings. In any or all of the preceding examples, additionally or optionally, the inner bearing portion adjoins the opening. In any or all of the preceding examples, additionally or optionally, the inner bearing portion is spaced apart from the opening. In any or all of the preceding examples, additionally or optionally, the inner bearing portion extends partially around the periphery of the opening.

Furthermore, in any or all of the preceding examples, additionally or optionally, the inner bearing portion comprises a surface that is configured to resist a proportion of a clamp load applied by the fastener. In any or all of the preceding examples, additionally or optionally, the surface area of the inner bearing portion is selected to provide a required bearing area for the clamp load applied by the fastener. In any or all of the preceding examples, additionally or optionally, the recess is an as-cast feature. In any or all of the preceding examples, additionally or optionally, the recess fluidically connects the opening to an inner face of the machinery casing portion. In any or all of the preceding examples, additionally or optionally, the machinery casing portion is one of a cylinder block of an engine, a crankcase of an engine, a cylinder head of an engine and a sump casing of an engine.

In another example, an engine or vehicle comprising one or more machinery casing portions, the one or more machinery casing portions having a first sealing face configured to engage a second sealing face of a second machinery casing portion so as to form a sealed joint therebetween in an assembled configuration; wherein the one or more machinery casing portions comprises a recess configured to receive a sealant, the recess being provided adjacent to the first sealing face; and at least one opening configured to receive a fastener, wherein the opening at least partially extends into a wall of the recess. In any or all of the preceding examples, additionally or optionally, the opening is formed inside an annular vertical pipe mounted in an interior region of the machinery casing portion. In any or all of the preceding examples, additionally or optionally, the machinery casing portion comprises a network of pipes to flow fuel or sealant fluid to engine components. In any or all of the preceding examples, additionally or optionally, the pipes are configured to withstand corrosive conditions and high temperature, including temperature above an upper threshold.

In other examples, a method of manufacturing a machinery casing portion, the machinery casing portion having a first sealing face configured to engage a second sealing face of a second machinery casing portion so as to form a sealed joint therebetween in an assembled configuration, the method comprises: providing a recess in the first sealing face, the recess being configured to receive a sealant; and providing at least one opening configured to receive a fastener, wherein the opening at least partially extends into a wall of the recess. In any or all of the preceding examples, additionally or optionally, the inner bearing portion comprises a surface that is configured to resist a proportion of a clamp load applied by the fastener. In any or all of the preceding examples, additionally or optionally, the recess fluidically connects the opening to an inner face of the machinery casing portion.

Furthermore, in any or all of the preceding examples, additionally or optionally, the recess divides the first sealing face into a peripheral bearing portion extending around a periphery of the first sealing face and at least one inner bearing portion, each inner bearing portion being adjacent to at least one of the openings. In any or all of the preceding examples, additionally or optionally, the inner bearing portion extends partially around the periphery of the opening. In any of the preceding examples, additionally or optionally, the second machinery casing portion has external planar surfaces.

FIGS. 1-3 show example configurations with relative positioning of the various components. If shown directly contacting each other, or directly coupled, then such elements may be referred to as directly contacting or directly coupled, respectively, at least in one example. Elements described as directly downstream or directly upstream of one another may be defined herein such that there are no intervening components between the two comparative elements. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example systems included herein can be used with various casing portion configurations. It will be appreciated that the configurations disclosed herein are exemplary in nature, and that these specific embodiments are not to be considered in a limiting sense, because numerous variations are possible. For example, the above technology can be applied to an engine system and other machine systems. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A first machinery casing portion having a first sealing face configured to engage a second sealing face of a second machinery casing portion to form a sealed joint therebetween in an assembled configuration, the first machinery casing portion comprising:
a recess configured to receive a bead of sealant, wherein the recess includes a sloping surface adjacent to the first sealing face; and
an opening configured to receive a fastener, wherein at least a portion of an edge of the opening directly adjoins a lower surface of the recess;
wherein the edge of the opening is vertically offset from the first sealing face.

2. The first machinery casing portion according to claim 1, wherein the recess divides the first sealing face into a peripheral bearing portion extending around a periphery of the first sealing face and an inner bearing portion and wherein the inner bearing portion is adjacent to the opening.

3. The first machinery casing portion according to claim 2, wherein the inner bearing portion adjoins the opening.

4. The first machinery casing portion according to claim 2, wherein the inner bearing portion is spaced apart from the opening.

5. The first machinery casing portion according to claim 2, wherein the inner bearing portion extends partially around a periphery of the opening.

6. The first machinery casing portion according to claim 2, wherein the inner bearing portion comprises a surface area configured to resist a proportion of a clamp load applied by the fastener.

7. The first machinery casing portion according to claim 6, wherein the surface area of the inner bearing portion is selected to provide a required bearing area for the clamp load applied by the fastener.

8. The first machinery casing portion according to claim 1, wherein the recess is an as-cast feature.

9. The first machinery casing portion according to claim 1, wherein the recess fluidically connects the opening to an inner face of the first machinery casing portion.

10. The first machinery casing portion according to claim 1, wherein the first machinery casing portion is one of a cylinder block of an engine, a crankcase of the engine, a cylinder head of the engine, and a sump casing of the engine.

11. An engine included in a vehicle comprising:
a first machinery casing portion having a first sealing face configured to engage a second sealing face of a second machinery casing portion to form a sealed joint therebetween in an assembled configuration;
wherein the first machinery casing portion comprises a recess configured to receive a bead of sealant; and
an opening configured to receive a fastener, wherein at least a portion of an edge of the opening directly adjoins a lower surface of the recess and wherein the edge of the opening is vertically offset from the first sealing face.

12. The engine according to claim 11, wherein the recess divides the first sealing face into a peripheral bearing portion extending around a periphery of the first sealing face and an inner bearing portion adjacent to the opening.

13. The engine according to claim 12, wherein the inner bearing portion extends partially around a periphery of the opening.

14. The engine according to claim 11, wherein the opening is formed inside an annular vertical pipe mounted in an interior region of the first machinery casing portion.

15. The engine according to claim 11, wherein the first machinery casing portion comprises a network of pipes to flow a fuel or sealant fluid to a plurality of engine components.

16. The engine according to claim 15, wherein the network of pipes is configured to withstand corrosive and high temperature conditions, including a condition where a temperature of the network of pipes is above an upper threshold.

17. A method of manufacturing a first machinery casing portion having a first sealing face configured to engage a second sealing face of a second machinery casing portion to form a sealed joint therebetween in an assembled configuration, the method comprising:
providing a recess in the first sealing face;
providing an opening configured to receive a fastener, wherein at least a portion of an edge of the opening directly adjoins a lower surface of the recess and wherein the edge of the opening is vertically offset from the first sealing face; and
applying a bead of sealant to the recess.

18. The method of manufacturing the first machinery casing portion according to claim 17, wherein the first sealing face comprises a surface that is configured to resist a proportion of a clamp load applied by the fastener.

19. The method of manufacturing the first machinery casing portion according to claim 17, wherein the recess fluidically connects the opening to an inner face of the first machinery casing portion.

20. The method of manufacturing the first machinery casing portion according to claim 17, wherein the second machinery casing portion has a plurality of external planar surfaces.

* * * * *